(12) United States Patent
Orii (10) Patent No.: US 8,157,317 B2
(45) Date of Patent: Apr. 17, 2012

(54) CAB BODY STRUCTURE

(75) Inventor: Taku Orii, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 122 days.

(21) Appl. No.: 12/515,995

(22) PCT Filed: Nov. 27, 2007

(86) PCT No.: PCT/JP2007/072863
§ 371 (c)(1),
(2), (4) Date: May 22, 2009

(87) PCT Pub. No.: WO2008/066044
PCT Pub. Date: Jun. 5, 2008

(65) Prior Publication Data
US 2010/0045071 A1    Feb. 25, 2010

(30) Foreign Application Priority Data

Nov. 27, 2006    (JP) .................................. 2006-319399

(51) Int. Cl.
*B62D 33/06* (2006.01)
(52) U.S. Cl. .......... 296/190.01; 296/190.08; 296/193.04
(58) Field of Classification Search .............. 296/190.01, 296/190.08, 193.04, 193.05, 193.06, 205, 296/96.21
See application file for complete search history.

(56) References Cited

U.S. PATENT DOCUMENTS

| 7,232,179 | B1 * | 6/2007 | Racz et al. ............... 296/190.02 |
| 7,416,243 | B2 * | 8/2008 | Dammann et al. ....... 296/190.03 |
| 7,765,699 | B2 * | 8/2010 | Corcoran et al. ............ 29/897.2 |
| 2005/0274017 | A1 * | 12/2005 | Corcoran et al. ............ 29/897.2 |
| 2007/0075566 | A1 * | 4/2007 | Lindemann et al. ..... 296/190.01 |
| 2010/0060036 | A1 * | 3/2010 | Orii ......................... 296/193.06 |

FOREIGN PATENT DOCUMENTS

| CN | 1530274 A | | 9/2004 |
| CN | 1564766 A | | 1/2005 |
| GB | 2237540 A | * | 5/1991 |
| JP | 62-62575 U | | 4/1987 |
| JP | 63-147376 U | | 9/1988 |
| JP | 2738961 B2 | | 4/1998 |
| JP | 11-245845 A | | 9/1999 |
| WO | 03029069 A2 | | 4/2003 |

* cited by examiner

Primary Examiner — Jason S Morrow (57) ABSTRACT

A cab body structure includes a cab front panel 10a, a cab rear panel, a pair of cab side panels 20, and a front window 50a. The pair of cab side panels 20 is arranged almost parallel to each other when width of the cab front panel 10a in the vehicle width direction and width of the cab rear panel in the vehicle width direction are set approximately equal, and arranged slanting on the outer side towards the rear along the vehicle width when width of the cab rear panel in the vehicle width direction is set greater than width of the cab front panel in the vehicle width direction.

2 Claims, 6 Drawing Sheets

RELATED ART

CAB BODY STRUCTURE

TECHNICAL FIELD

The present invention relates to a cab body structure.

BACKGROUND ART

Figure 10:
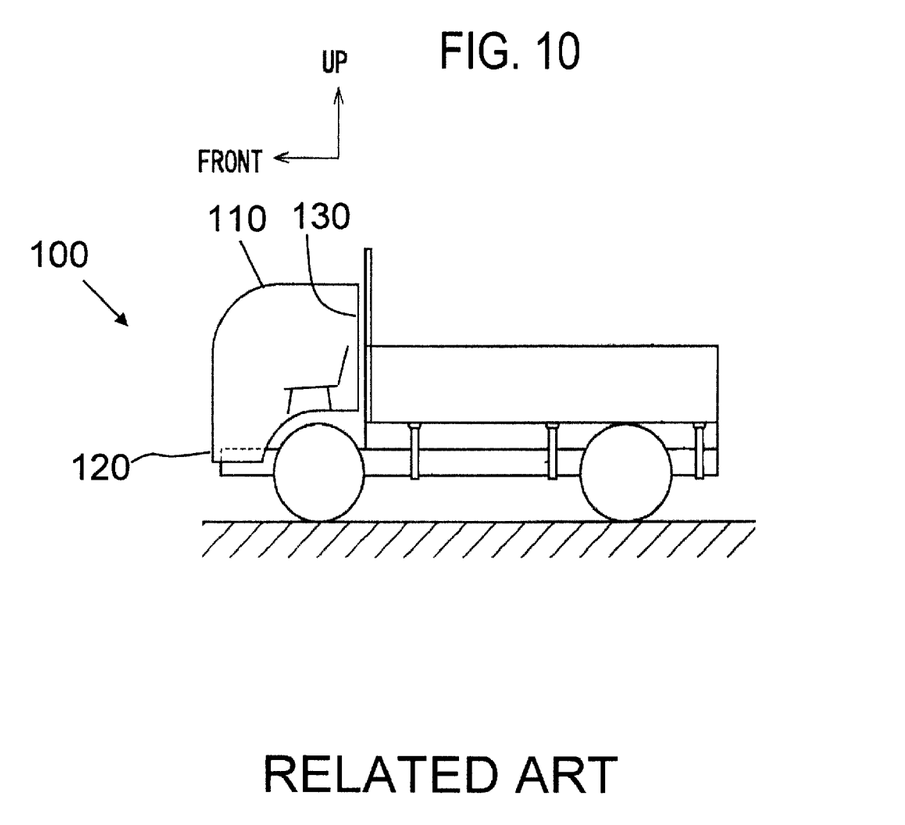
FIG. 10 is schematic side view of a vehicle.

As schematically illustrated in FIG. 10, a cab 100 having a driver's seat includes a pair of cab side panels 110 arranged on either vehicle side thereof, a cab front panel 120, and a cab rear panel 130. The cab side panel includes a front end, which is connected to both ends of a cab front panel and a front window in the vehicle width direction, a back end, which is connected to both ends of a cab rear panel in the vehicle width direction, and a door opening, which is formed between the front end and the back end. Moreover, it is well known that communalization of a cab side panel is possible by adopting the same cab side panel to cabs differing in width.

A cab having a driver's seat includes a pair of cab side

[Patent Document 1] Patent Application Publication No. 2738961

DISCLOSURE OF THE INVENTION

Problems to be Solved by the Invention

Here, communalization of a cab side panel is generally carried out by connecting the cab side panels to a cab front panel and a cab rear panel having equal width in the vehicle width direction. However, if width of the cab front panel and the cab rear panel is simply increased as the cab size is increased and a pair of cab side panels is arranged almost parallel to each other, traveling air flow while the vehicle is running may go off the outer surfaces of the cab side panels on the front side, and swirling currents flowing towards the vehicle rear on the sides of the cab may generate easily. These swirling currents may increase air resistance and lead to negative effects such as generation of unwanted sound and lower fuel efficiency.

Therefore, the present invention aims to provide a cab body structure allowing suppression of increase in air resistance as cab size increases, and application of a common cab side panel to cabs differing in width.

Means for Solving the Problems

The cab body structure according to the present invention, which should accomplish the above-given purpose, includes a cab front panel, a cab rear panel, a pair of cab side panels, and a front window. The cab rear panel is arranged facing behind the cab front panel. The pair of cab side panels has front ends, which are connected to both respective ends of the cab front panel in the vehicle width direction, back ends, which are connected to both respective ends of the cab rear panel in the vehicle width direction, and door openings, which are formed between the front ends and the back ends, respectively. The front window is attached to a front window opening partitioned into an upper edge of the cab front panel and front edges of the cab side panels. The pair of cab side panels is arranged almost parallel to each other when width of the cab front panel in the vehicle width direction is almost equal to width of the cab rear panel in the vehicle width direction, and arranged slanting on the outer side towards the rear along the vehicle width when width of the cab rear panel in the vehicle width direction is greater than width of the cab front panel in the vehicle width direction.

With this structure, the pair of cab side panels may be employed for a cab having width of the cab rear panel in the vehicle width direction equal to that of the cab front panel, and a cab having width of the cab rear panel in the vehicle width direction set greater than that of the cab front panel. As a result, since the cabs differing in width in the vehicle width direction may use the cab side panel in common, reduction in manufacturing cost of the cab side panel due to communalization of the component is possible.

Moreover, size of the cab may be increased by setting the width of the cab rear panel in the vehicle width direction to be greater than that of the cab front panel, wherein at this time, the cab side panels are arranged slanting on the outer side towards the rear along the vehicle width. In other words, since the cab side panels are arranged slanting outward along the vehicle width against the traveling air flow while the vehicle is running, flow of air while the vehicle is running is adjusted so as to be rectified by the outer surface of the cab side panels. As a result, since the air flowing along the side of the cab while the vehicle is running is favorably guided towards the rear of the vehicle by the cab side panels, increase in air pressure as cab size is increased may be suppressed.

Alternatively, the cab body structure may further include a connection auxiliary component over which the cab front panel and the cab side panels are arranged. The connection auxiliary component is arranged between the upper edge of the cab front panel and the front edge of the cab side panel, and may include an upper edge partitioning a lower corner of the front window opening. It may be formed in different shapes when width of the cab front panel in the vehicle width direction is equal to width of the cab rear panel in the vehicle width direction, and when width of the cab front panel in the vehicle width direction is set greater than width of the cab rear panel in the vehicle width direction.

With this structure, the cab side panels are connected to the cab front panel and the front window via the connection auxiliary component. The connection auxiliary component includes the upper edge partitioning a lower corner of the front window opening, and is formed in a shape according to connecting angles between the cab front panel and the respective cab side panels. In other words, even when forms of both ends in the vehicle width direction of the cab front panel and both end lower portions in the vehicle width direction of the front window differ according to connecting angles between the cab front panel and the respective cab side panels, that differing form may be absorbed by the connection auxiliary component. Accordingly, when the pair of cab side panels is either arranged almost parallel or slanting on the outer side towards the rear along the vehicle width, secure connection of the cab side panels to the cab front panel and the front window is possible. Moreover, since over the connection auxiliary component are arranged and connected the cab front panel, the front window, and the cab side panels, secure connection of these is possible.

Effects of the Invention

The present invention allows suppression of increase in air resistance as cab size increases, and application of a cab side panel in common to cabs differing in width in the vehicle width direction.

EXPLANATION OF REFERENCE NUMERALS

A, B Vehicle
10a, 10b Cab front panel
20 Cab side panel
23 Front end
30 Back end
40a, 40b Connection auxiliary component
41a, 41b upper edge
50a, 50b Front window

BEST MODE FOR CARRYING OUT THE INVENTION

Figure 1:
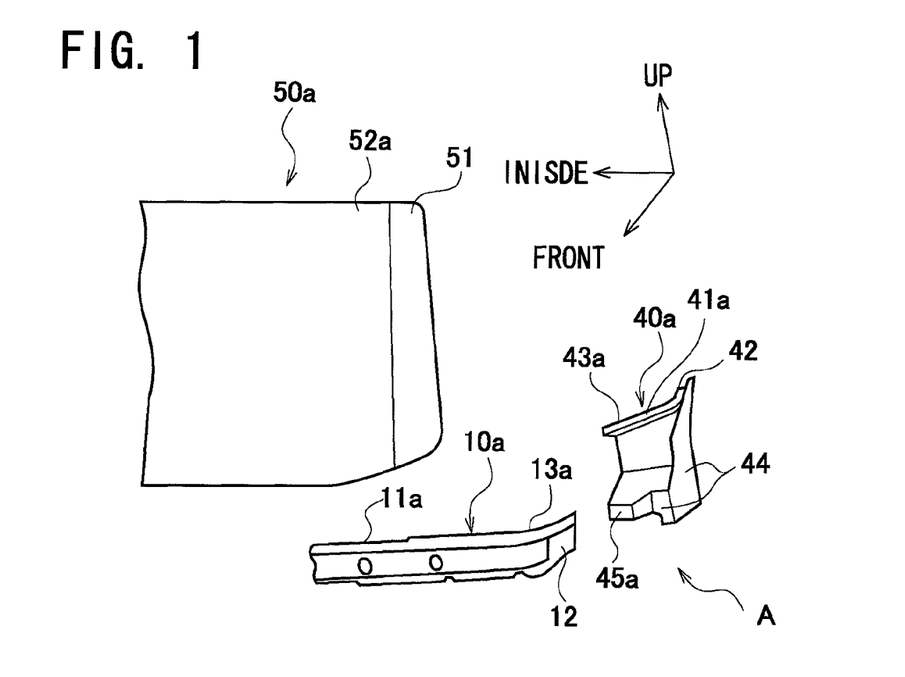
FIG. 1 is a perspective view of a cab front panel, a front window, and a connection auxiliary component of a vehicle A with a cab body structure according to an embodiment.
Figure 2:
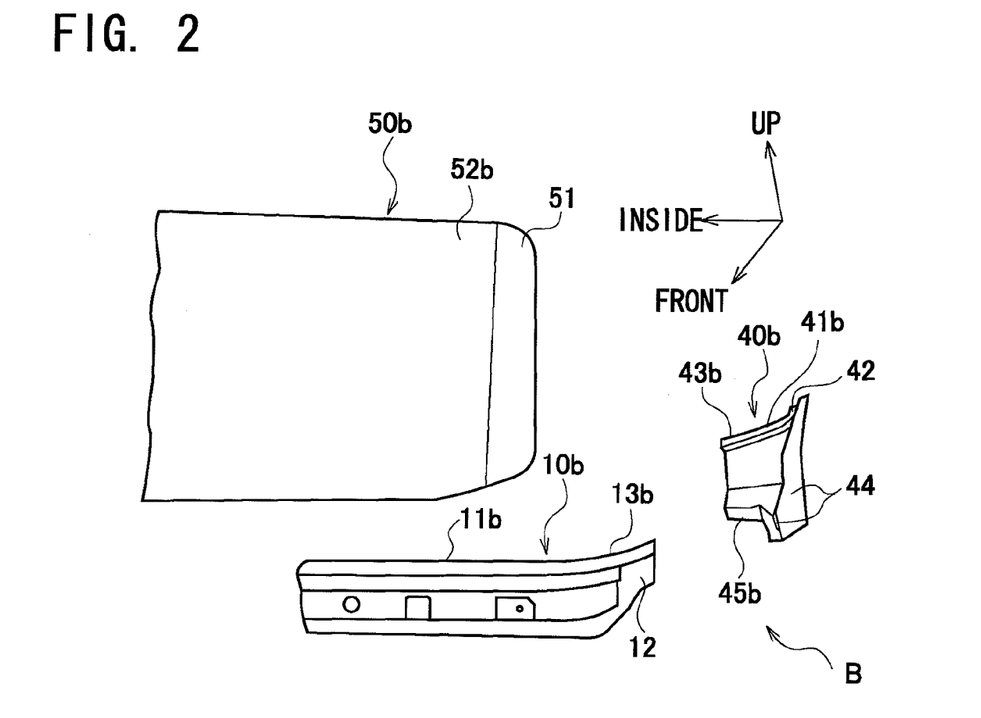
FIG. 2 is a perspective view of a cab front panel, a front window, and a connection auxiliary component of a vehicle B with the cab body structure according to this embodiment.
Figure 3:
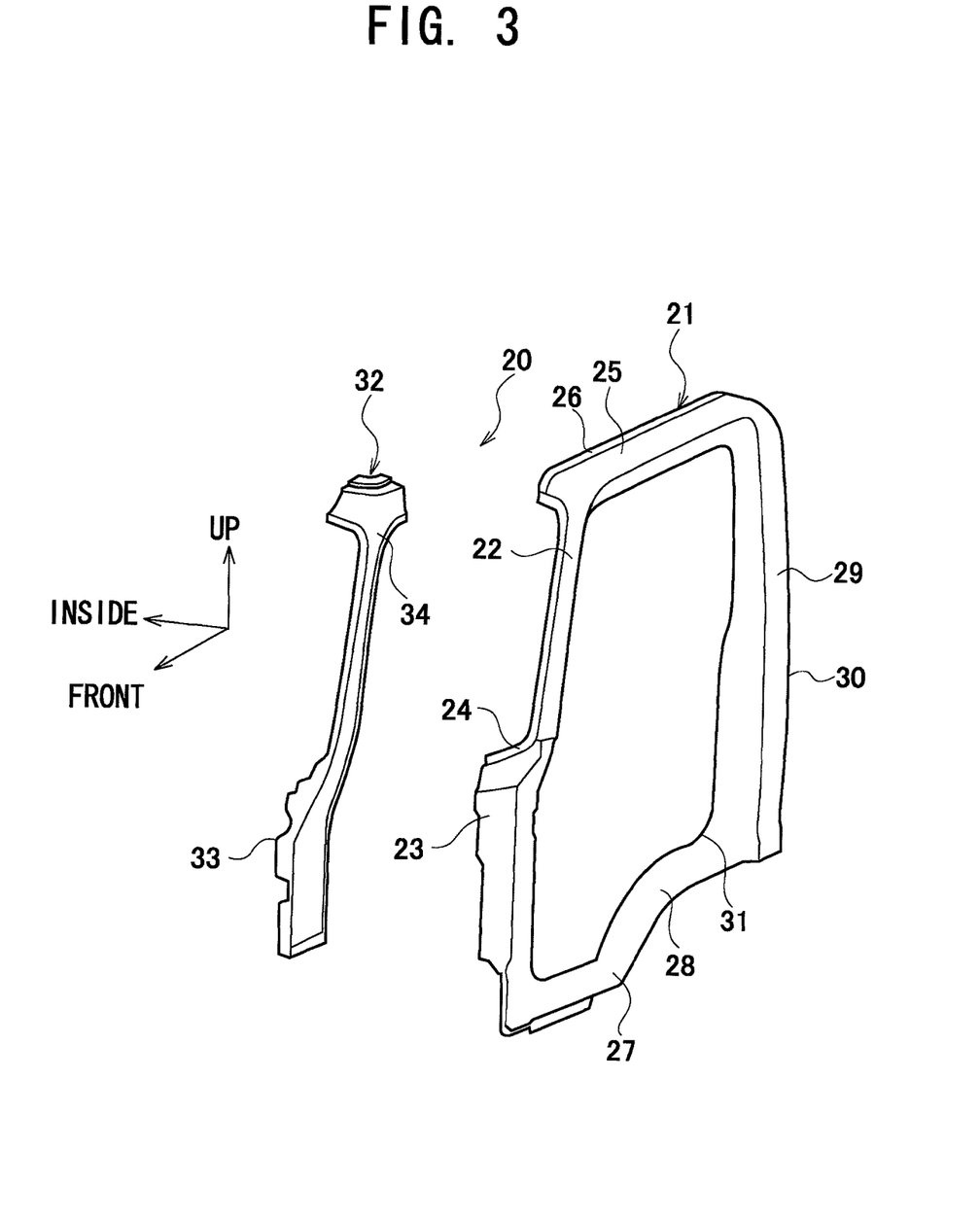
FIG. 3 is a perspective view of a cab side panel of a cab body structure according to this embodiment.
Figure 4:
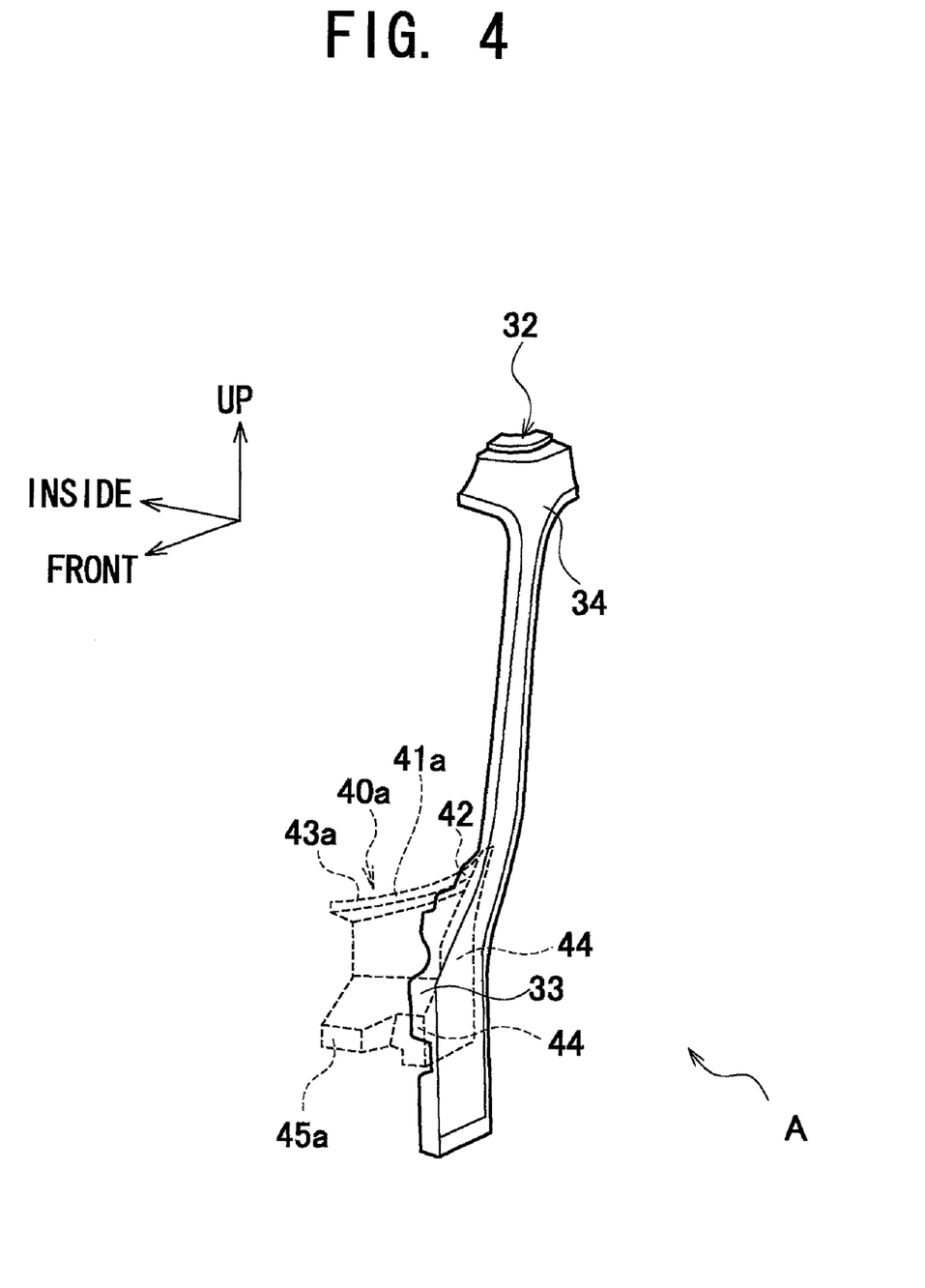
FIG. 4 is a perspective view of a state where the connection auxiliary component is attached to an inner panel of the cab side panel of the vehicle A according to this embodiment.
Figure 5:
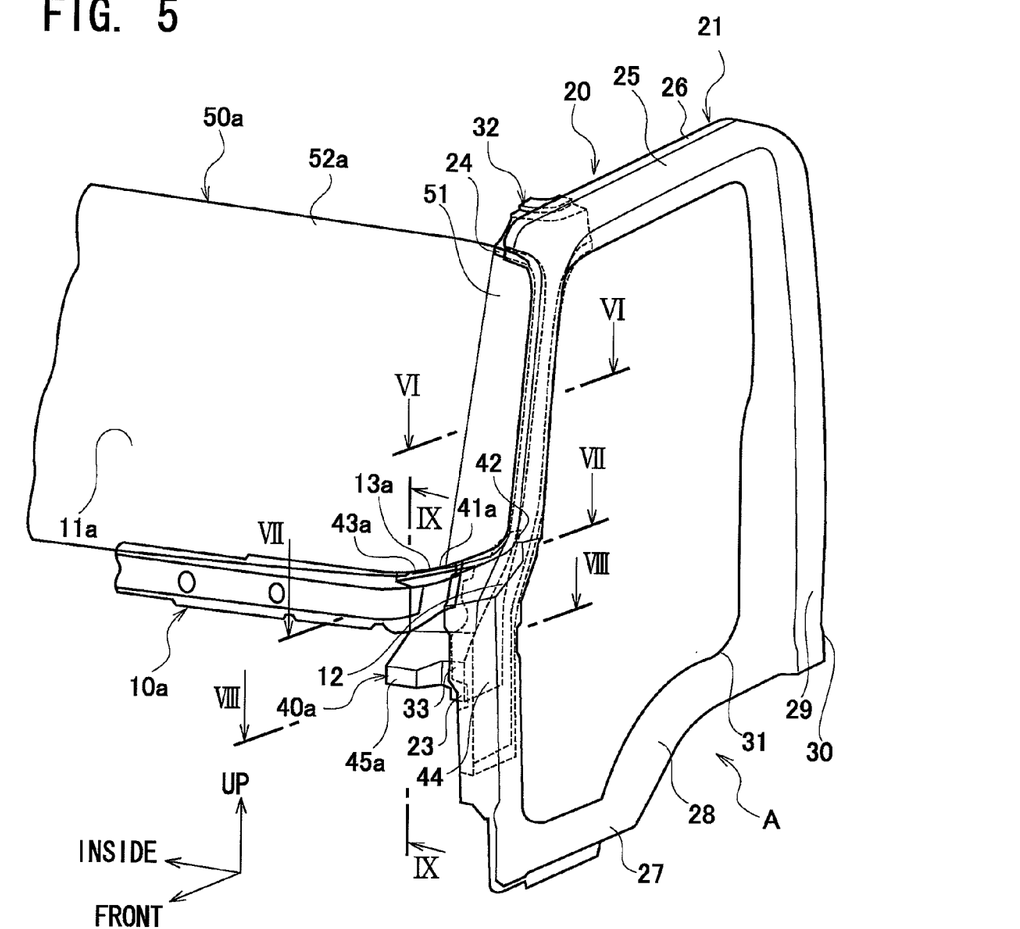
FIG. 5 is a perspective view showing a part of the vehicle A with the cab body structure according to this embodiment.
Figure 6:
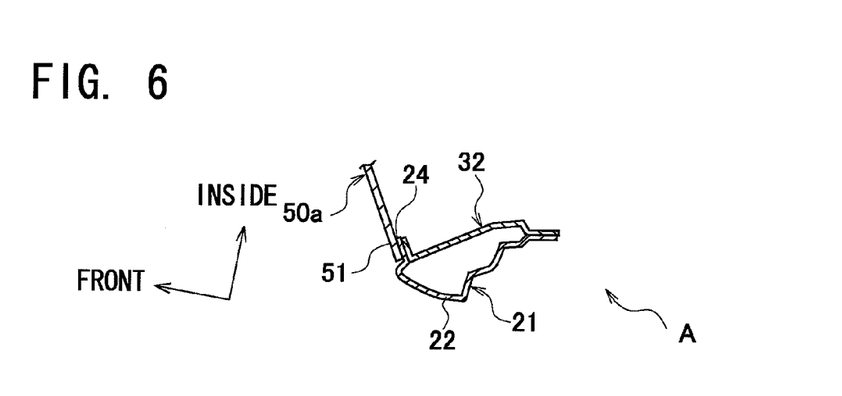
FIG. 6 is a cross section viewed from line VI-VI of FIG. 5.
Figure 7:
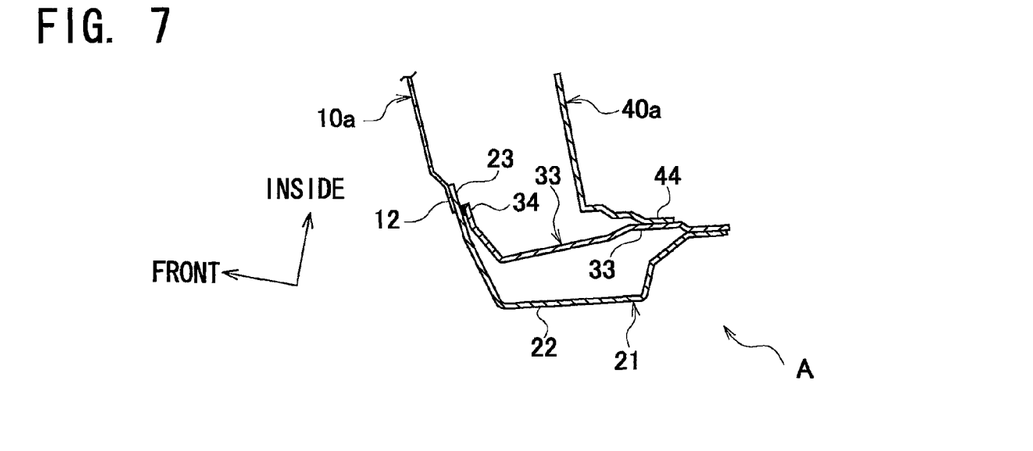
FIG. 7 is a cross section viewed from line VII-VII of FIG. 5.
Figure 8:
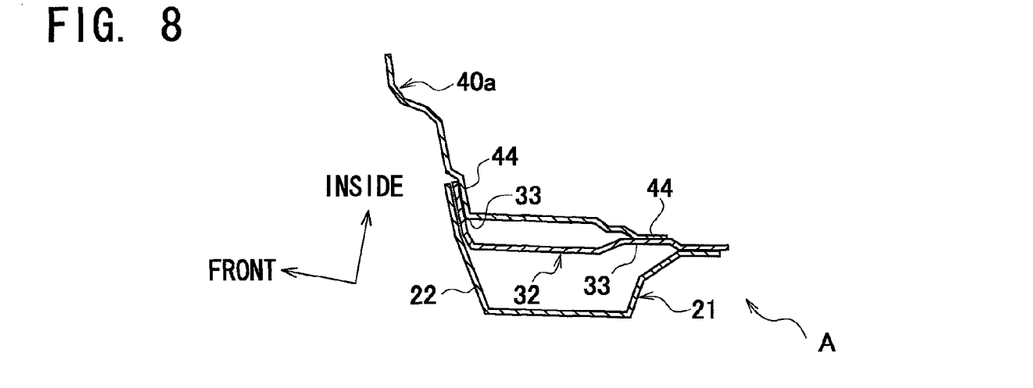
FIG. 8 is a cross section viewed from line VIII-VIII of FIG. 5.
Figure 9:
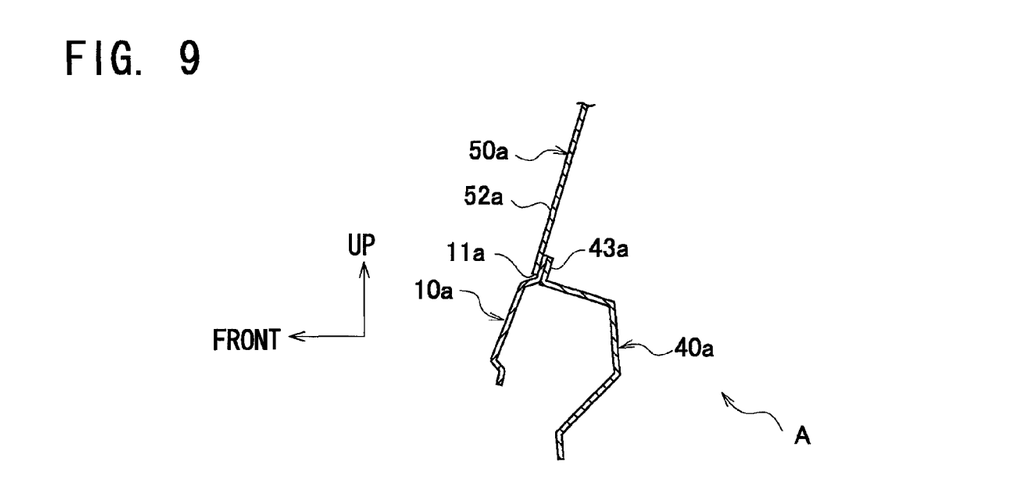
FIG. 9 is a cross section viewed from IX-IX of FIG. 4.

Hereafter, an embodiment according to the present invention is described. FIG. 1 is a perspective view of a cab front panel, a front window, and a connection auxiliary component of a vehicle A with a cab body structure according to an embodiment. FIG. 2 is a perspective view of a cab front panel, a front window, and a connection auxiliary component of a vehicle B with the cab body structure according to this embodiment. FIG. 3 is a perspective view of a cab side panel of a cab body structure according to this embodiment. FIG. 4 is a perspective view of a state where the connection auxiliary component is attached to an inner panel of the cab side panel of the vehicle A according to this embodiment. FIG. 5 is a perspective view showing a part of the vehicle A with the cab body structure according to this embodiment. FIG. 6 is a cross section viewed from line VI-VI of FIG. 5. FIG. 7 is a cross section viewed from line VII-VII of FIG. 5. FIG. 8 is a cross section viewed from line VIII-VIII of FIG. 5. FIG. 9 is a cross section viewed from IX-IX of FIG. 5. Note that 'FRONT' in these illustrations denotes the vehicle front, 'UP' denotes the vehicle top, and 'INSIDE' denotes the vehicle interior. Hereafter, when structures of the vehicle A and the vehicle B differ, a symbol a is attached for the structure of the vehicle A, and symbol b is attached for the structure of the vehicle B.

As shown in FIGS. 1 to 9, the cab body structure of this embodiment is provided to a cab (hereafter referred to as cab A (omitted from the drawings)) of the vehicle A, and a cab (hereafter referred to as cab B (omitted from the drawings)) for the vehicle B having a width of a predetermined distance greater than that of the vehicle A. The cab A and the cab B include cab front panels 10a and 10b, cab rear panels (hereafter, referred to as the cab rear panel for the vehicle A, and cab rear panel for the vehicle (omitted from the drawings)), a cab side panel 20, connection auxiliary components 40a and 40b, and front windows 50a and 50b, respectively.

The cab front panels 10a and 10b are arranged in the vehicle front, and include front window supports 11a and 11b, a cab side panel connecting end 12, and connection auxiliary component connecting parts 13a and 13b, respectively. A part of the cab front panels 10a and 10b is shown in the drawings. The cab front panel 10b has a predetermined length longer than the cab front panel 10a in the vehicle width direction. The front window supports 11a and 11b are formed on upper edges of the cab front panels 10a and 10b, respectively. The cab side panel connecting end 12 is formed on either end of the cab front panels 10a and 10b in the vehicle width direction, and has a common form for the vehicle A and the vehicle B. The connection auxiliary component connecting parts 13a and 13b are formed on rear surfaces of the cab front panels 10a and 10b, respectively.

The cab rear panel for the vehicle A and the cab rear panel for the vehicle B are arranged in the vehicle rear facing the cab front panels 10a and 10b, respectively, covering the rear of the cabs. The cab rear panel for the vehicle B has a predetermined length longer than the cab rear panel for the vehicle A in the vehicle width direction. Moreover, width of the cab rear panel for the vehicle A in the vehicle width direction is equal to width of the cab front panel 10a. Furthermore, difference in distance between the cab rear panel for the vehicle A and the cab rear panel for the vehicle B in the vehicle width direction is greater than that between the cab front panel 10a and the cab front panel 10b.

The cab side panel 20 is used in common for the vehicle A and the vehicle B. A pair of cab side panels 20 is arranged on either end of the cab front panels 10a and 10b, the cab rear panel for the vehicle A and the cab rear panel for the vehicle B in the vehicle width direction. The pair of cab side panels 20 is arranged almost parallel to each other in the vehicle A, and slanting on the outer side towards the rear along the vehicle width in the vehicle B. Each of the cab side panels 20 includes an outer panel 21, which is a shell-plate component on sides of the cab A and the cab B, and an inner panel 32 arranged facing the inner side of the outer panel in the vehicle width direction. The outer panel 21 includes a front pillar outer section 22, a roof side rail outer section 25, a locker outer section 27, and a rear pillar outer section 29 integratedly formed as a single body, and a door opening 31. The front pillar outer section 22 bends and extends upward, and includes a front end 23 and a front window attachment 24. The front end 23 is connected to the cab side panel connecting end 12 of each of the cab front panels 10a and 10b. The front window attachment 24 is formed at a front edge of the front pillar outer section 22. The roof side rail outer section 25 includes a top panel connecting part 26 extending towards the vehicle rear from an upper end of the front pillar outer section 22, and connected to a top panel (omitted from the drawings) covering the tops of the cab A and the cab B. The locker outer section 27 includes an arch-like wheel house 28, which bends and extends towards the vehicle rear from a lower end of the front pillar outer section 22, covering a front wheel (omitted from the drawing) from above. The rear pillar outer section 29 extends downward from a back end of the roof side rail outer section 25 and a back end of the locker outer section 27, and includes a back end 30. The back end 30 is connected to both ends of the cab rear panel for the vehicle A and the cab rear panel for the vehicle B in the vehicle width direction. The door opening 31 is partitioned into a front edge of the front pillar outer section 22, an upper edge of the roof side rail outer section 25, a lower edge of the locker outer section 27, and a trailing edge of the rear pillar outer section. The door opening 31 is blocked while a door (omitted from the drawings) is arranged in a closed position. The inner panel 32 is arranged facing the inner side of the front pillar outer section 22 in the vehicle width direction, and includes a connection auxiliary component attachment 33 and an outer panel connecting part 34. The outer panel connecting part 34 is joined through welding or another joining process to the front pillar outer section 22.

Over the connection auxiliary components 40a and 40b are arranged, respectively, the connection auxiliary component connecting parts 13a and 13b and each corresponding connection auxiliary component attachment 33 of the cab side panel 20, and are formed in respective specific shapes according to connecting angle between the cab side panel 20 and the cab front panel 10a and connecting angle between the cab side panel 20 and the cab front panel 10b. The connection auxiliary components 40a and 40b include upper edges 41a and 41b, an inner panel connecting part 44, and front panel connecting parts 45a and 45b, respectively. A same-shaped outer end 42 of the upper edges 41a and 41b is used for both of the vehicle A and the vehicle B while the inner ends 43a and 43b differently shaped are used for the respective vehicle A and vehicle B. The inner panel connecting part 44 is joined through welding or another joining process to the connection auxiliary component attachment 33 of the cab side panel 20 on an outer side portion thereof in the vehicle width direction and on the front side, and the outer side portions have the same form for both of the vehicle A and the vehicle B. The front panel connecting parts 45a and 45b have forms differing from each other according to the vehicle A and the vehicle B, and are joined through welding or another joining process to the connection auxiliary component connecting parts 13a and 13b of the cab front panels 10a and 10b, respectively. The front panel connecting part 45a used for the vehicle A has a protruding shape, and tip thereof touches the connection auxiliary component connecting part 13a. The front panel connecting part 45b used for the vehicle B does not have a protruding shape, and touches the connection auxiliary component connecting part 13b.

The front windows 50a and 50b are transparent plate-like made of glass or plastic protruding and curving forward, and are arranged, respectively, at front window openings partitioned into the front window supports 11a and 11b of the cab front panels 10a and 10b, each corresponding front window attachment 24 of the cab side panel 20, and the upper edges 41a and 41b of the connection auxiliary components 40a and 40b, and are attached thereto through welding or another joining process, respectively. A side attaching region 51 of each of the front windows 50a and 50b, which faces the front pillar outer section 22 of the cab side panel 20 on either side in the vehicle width direction, has a form in common for both of the vehicle A and the vehicle B. Center regions 52a and 52b other than the side attachment region 51 of the front windows 50a and 50b have forms differing from each other according to the vehicle A and the vehicle B, respectively. The center region 52b has a predetermined distance longer in the vehicle width direction than the center region 52a.

According to the present invention, the pair of cab side panels 20 may be employed for the cab A of the vehicle A having width of the cab rear panel for the vehicle A in the vehicle width direction set to be equal to that of the cab front panel 10a, and the cab B of the vehicle B having width of the cab rear panel for the vehicle B in the vehicle width direction set greater than that of the cab front panel 10b. As a result, since the cabs differing in width from each other in the vehicle width direction may use the cab side panel 20 in common, reduction in manufacturing cost of the cab side panel 20 is possible.

Moreover, size of the cab B may be increased by setting the width of the cab rear panel for the vehicle B in the vehicle width direction to be greater than that of the cab front panel 10b, wherein at this time, the cab side panel 20 is arranged slanting on the outer side towards the rear along the vehicle width. In other words, since the cab side panel 20 is arranged slanting outward along the vehicle width against the traveling air flow while the vehicle is running, flow of air while the vehicle is running is adjusted so as to be rectified by the outer surface of the cab side panel 20. As a result, since the air flowing along the side of the cab while the vehicle is running is favorably guided towards the rear of the vehicle by the cab side panel 20, increase in air pressure as cab size is increased such as from the cab A to the cab B may be suppressed.

Moreover, the cab side panel 20 is connected to the cab front panels 10a and 10b and the front windows 50a and 50b via the connection auxiliary components 40a and 40b, respectively. The connection auxiliary components 40a and 40b include the upper edges 41a and 41b partitioning lower corners of the front window openings, respectively, and are formed in shapes according to connecting angle between the cab side panel 20 and the cab front panel 10a and angle between the cab side panel 20 and the cab front panel 10b, respectively. In other words, even when forms of both end lower portions in the vehicle width direction of the connection auxiliary component connecting parts 13a and 13b of the cab front panels 10a and 10b and the center regions 52a and 52b of the front windows 50a and 50b differ according to connecting angle between the cab side panel 20 and the cab front panels 10a and angle between the cab side panel 20 and the cab front panel 10b, respectively, that differing form may be absorbed by the connection auxiliary components 40a and 40b. Moreover, since over the connection auxiliary components 40a and 40b are arranged and connected, respectively, the cab front panels 10a and 10b, the front windows 50a and 50b, and the cab side panels 20, respectively, secure connection of these is possible. Accordingly, when the pair of cab side panels 20 is either arranged almost parallel or slanting on the outer side towards the rear along the vehicle width, secure connection of the cab side panels 20 to the cab front panels 10a and 10b and the front windows 50a and 50b, respectively, is possible.

While the embodiment according to the invention devised by the inventor(s) has been described thus far, the present invention is not limited to the descriptions and drawings of this embodiment constituting a part of the disclosure of the present invention. Namely, it should be added that other embodiments, working examples, and operational technologies devised by person(s) skilled in the art according to this embodiment are all naturally included within the scope of this invention.

Industrial Applicability

The present invention is applicable to various vehicles.

The invention claimed is:

1. A cab body structure comprising:
a cab front panel;
a cab rear panel arranged facing behind of the cab front panel;
a pair of cab side panels, having front ends, which are connected to respective ends of the cab front panel in a vehicle width direction, back ends, which are connected to respective ends of the cab rear panel in the vehicle width direction, and door openings, which are formed between the front ends and the back ends, respectively, and forming a connecting angle with the cab front panel which is determined according to a difference between a width of the cab front panel in the vehicle width direction and a width of the cab rear panel in the vehicle width direction, a front window, which is attached to a front window opening partitioned into an upper edge of the cab front panel and front edges of the cab side panels; and connection auxiliary components which connect the cab front panel and each of the cab side panels, and are formed in a shape which varies according to the determined connecting angle formed between the cab front panel and each of the cab side panels, wherein the pair of cab side panels is arranged almost parallel to each other and forms a first connecting angle with the cab front panel, when a width of the cab front panel and a width of the cab rear panel in the vehicle width direction are set approximately equal in a first vehicle, arranged slanting on an outer side from the cab front panel toward the cab rear panel as seen in the vehicle width direction and forms a second connecting angle, different from the first connecting angle, when the width of the cab rear panel is set greater than the width of the cab front panel in the vehicle width direction in a second vehicle, and the connection auxiliary components are formed in a first shape according to the first connecting angle determined for the first vehicle and in a second shape, different from the first shape, according to the second connecting angle determined for the second vehicle.

2. The cab body structure of claim 1, wherein each of the connection auxiliary components comprises:

an upper edge which partitions a lower corner of a window opening and comprises an inner end, a shape of which is different for the first connecting angle and the second connecting angle and is determined according to the first connecting angle and the second connecting angle, and an outer end, a shape of which is the same for the first connecting angle and the second connecting angle;

an inner panel connecting part which is joined to a corresponding cab side panel in the vehicle width direction; and a front panel connecting part, a shape of which is different for the first connecting angle and the second connecting angle and is determined according to the first connecting angle and the second connecting angle, and which is joined to the cab front panel.

* * * * *